June 15, 1954   J. S. DONALDSON   2,681,094
ANCHORING MEANS FOR WHEEL ANTISKID HARNESS
Filed April 22, 1949   2 Sheets-Sheet 2
FIG. 3
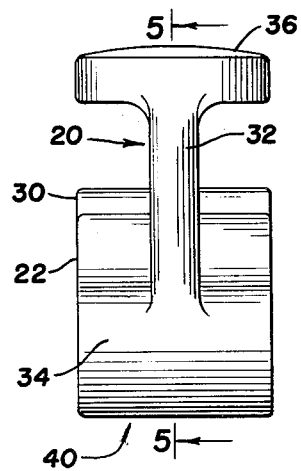
FIG. 4
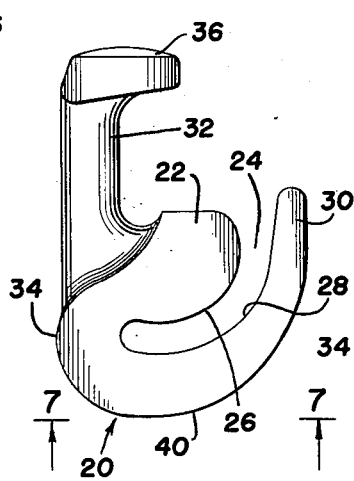
FIG. 5
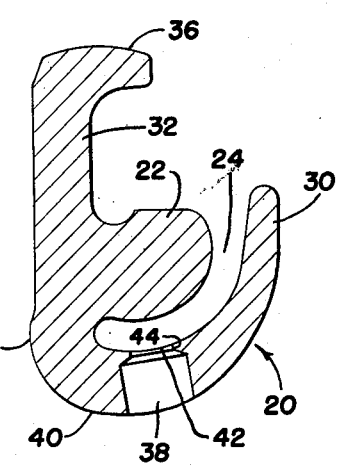
FIG. 6
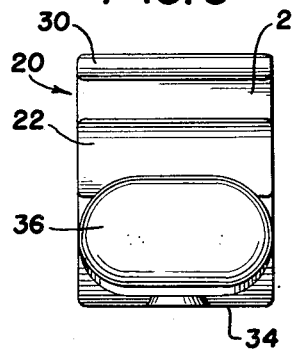
FIG. 7
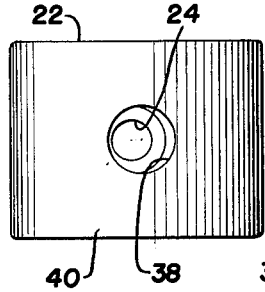
FIG. 8
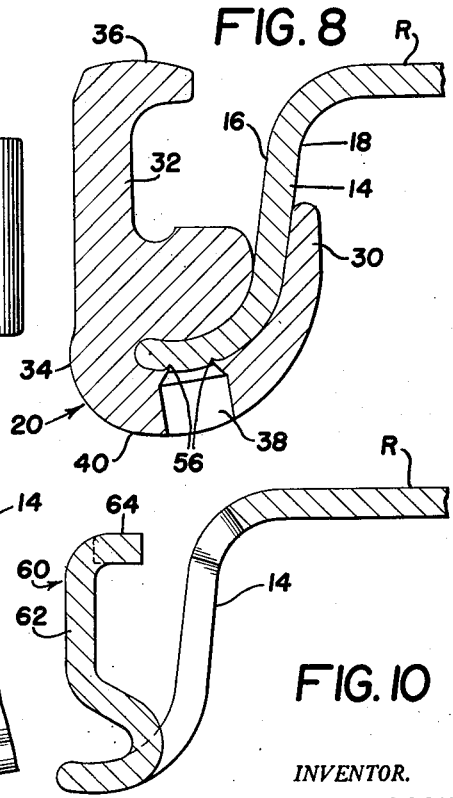
FIG. 9
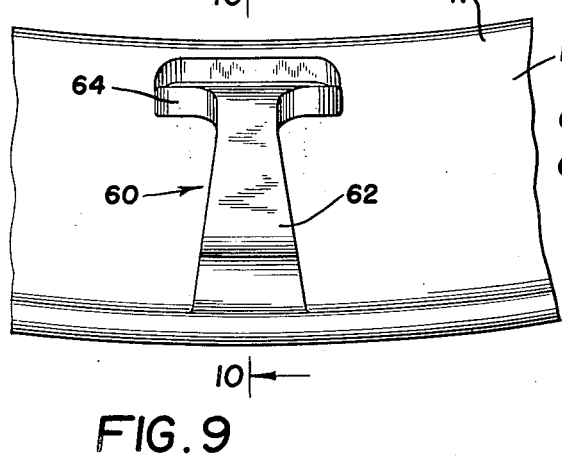
FIG. 10
INVENTOR.
JOHN S. DONALDSON
BY
F. J. Pisarra
ATTORNEY.

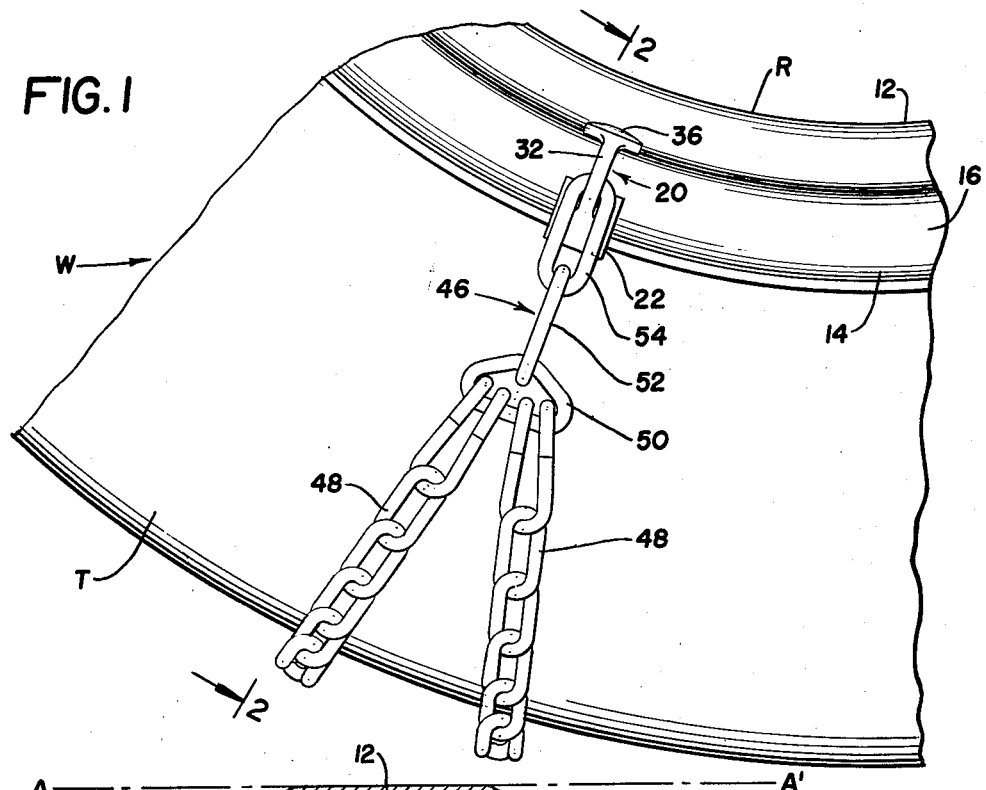
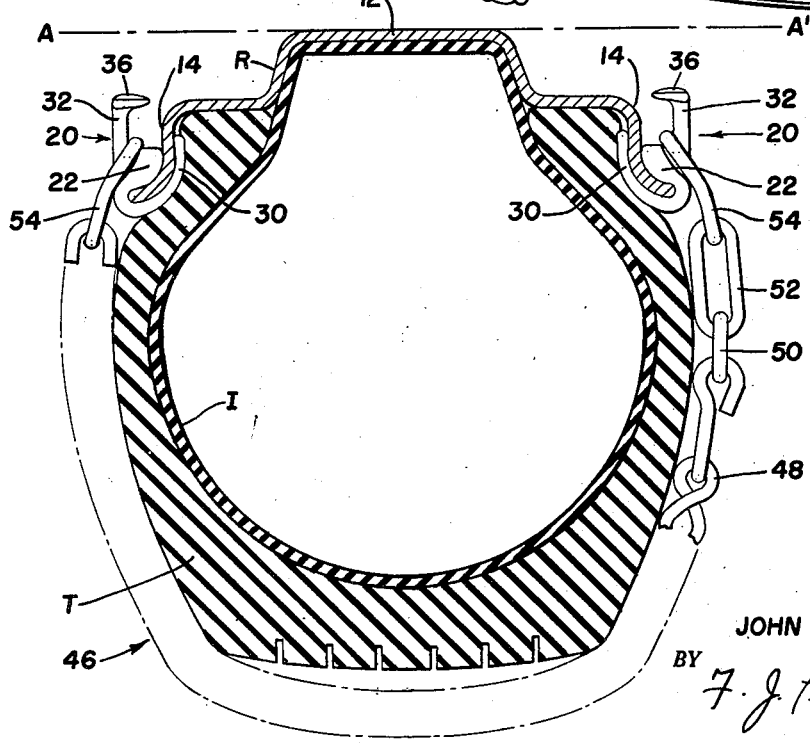

Patented June 15, 1954

2,681,094

UNITED STATES PATENT OFFICE 2,681,094

ANCHORING MEANS FOR WHEEL ANTISKID HARNESS

John S. Donaldson, Chatham, N. J.

Application April 22, 1949, Serial No. 88,924

2 Claims. (Cl. 152—236)

This invention relates to anchoring means for anti-skid and traction harnesses for wheels, such as automobile wheels.

This application is a continuation-in-part of my pending application, Serial No. 738,637, filed April 1, 1947 and now abandoned.

Conventional full tire chains for automobile wheels generally include a plurality of spaced cross or tread pieces that extend between two relatively long side pieces which form complete circles at the inner and outer sides of the tire when the chain is secured to a wheel. In applying such chains, it is necessary either to spread the chains out on the road and drive the vehicle wheel upon them, or to jack up the vehicle wheel to permit the chains being passed under the tire. Both procedures are time-consuming and laborius. Further, it is impossible to apply such chains to the wheels of a vehicle after the wheels have sunk into mud, sand, snow, or the like.

The present invention overcomes the foregoing difficulties in applying full tire chains to wheels, by permitting ready attachment of the chain elements to improved anchoring means or devices that are carried by the wheel rim, whether the wheel is resting on a hard-surfaced road or has become mired in mud, sand, snow, or the like.

The anchoring means of this invention is admirably suited to permit emergency anti-skid harnesses to be readily and rapidly attached to or removed from a wheel. My anchoring means is so constructed and arranged as to permit the ends of emergency harnesses to be quickly and easily secured to the wheel, thereby eliminating the need for straps and buckles that are essential parts of certain present-day emergency anti-skid harnesses. As will be apparent from the detailed description that follows, emergency anti-skid harnesses may be more readily attached to and removed from the anchoring means of this invention than has been heretofore possible with conventional emergency anti-skid harnesses.

It is a principal object of the invention to provide an improved means for anchoring anti-skid harnesses on a wheel. Such harnesses may be what are generally termed "full tire chains" or "emergency tire chains."

Another object of the invention is to provide anchoring means for an anti-skid harness for a wheel, which anchoring means may be integral with the wheel or may be detachably mounted on the wheel.

Another object of the invention is to provide anti-skid harness anchoring means adapted to be readily attached to or removed from the rim of a rubber tired wheel while the tire is mounted on the rim.

A further object of the invention is to provide improved anchoring means of the character indicated, so constructed and arranged with respect to the parts of a wheel as to facilitate attachment or removal of an anti-skid harness on or from a wheel, regardless of whether the wheel is on a firm surface or is mired.

A still further object of the invention is to provide apparatus of the character indicated that is simple and sturdy in construction, reasonable in manufacturing cost, and capable of performing its intended functions in an efficient and trouble-free manner.

With the above and other objects in view, the invention comprises the devices, combinations and arrangements of parts set forth in the following detailed description and illustrated in the annexed drawings of preferred illustrative embodiments of the invention, from which the several features of the invention, together with the advantages obtainable thereby, will be readily understood by persons skilled in the art.

In the drawings:

Figure 1 is a view in side elevation of a portion of a typical automobile wheel illustrating one recommended form of anchoring means of the invention and an emergency tire chain operatively mounted on the wheel;

Figure 2 is a cross-sectional view taken along line 2—2 of Figure 1;

Figure 3 is a front elevational view in enlargement of the anchoring means or device shown in Figures 1 and 2;

Figure 4 illustrates the anchoring means of Figure 3, as viewed from the right thereof;

Figure 5 is a view taken along line 5—5 of Figure 3;

Figure 6 is a top plan view of Figure 3;

Figure 7 is a bottom plan view of Figure 4;

Figure 8 corresponds to Figure 5 and illustrates the anchoring means mounted on a wheel rim;

Figure 9 is a fragmentary view of a second embodiment of the invention; and

Figure 10 is a view taken along line 10—10 of Figure 9 and corresponds to Figure 8.

Referring now to the drawings wherein like reference characters denote corresponding parts throughout the several views, and more particularly to Figures 1 and 2, I have illustrated therein an outer portion of a wheel, such as an automobile wheel W, that includes a circular rim R, a tire casing T, and an inner tube I. Rim R is generally U-shaped in cross section, as best shown in Figure 2, and comprises a web 12 and a pair of spaced-apart side flanges 14 that extend outwardly of the web. The outer and inner surfaces of each flange 14 are denoted by numerals 16 and 18, respectively (Figure 8).

A recommended form of improved anchoring means or device for securing an anti-skid harness to wheel W is shown in Figures 1-8 and is generally indicated by numeral 20. The anchoring device is preferably made of forged steel and comprises a body member 22 having a longitudinal through slot 24 that extends downwardly and forwardly of the rear upper part of the body member and terminates inwardly of the front of the body member. Opposite surfaces of the body member that define slot 24 are denoted by numerals 26 and 28. The lower and rear portions of the body member constitute an arcuate tongue 30.

Integral with body member 22 is an upstanding arm 32 that is positioned wholly rearwardly of front surface 34 of the body member. The free end of arm 32 is provided with an integral head 36 that is preferably generally normal to the axis of the arm and projects rearwardly and to each side of the arm, as best shown in Figures 3 and 4.

Tongue 30 may be provided with a through opening 38 that extends upwardly from bottom surface 40 of the body member and communicates with slot 24. Opening 38 includes an inner portion 42 of reduced diameter defined by a relatively thin, inwardly projecting flange or shoulder 44.

The anchoring means or device of this invention is adapted to be advantageously employed to effect ready and rapid attachment or removal of a full tire chain, such as the one disclosed in my said pending application or of an emergency tire chain or harness 46, shown in Figures 1 and 2. Harness 46 includes a pair of road-engaging chain members 48 that are connected at their ends by triangular coupler links 50, only one of which is shown. Secured to the illustrated coupler link 50 is a connector link 52 which is, in turn, connected to an end link 54. It will be noted that one such end link 54 is provided at each end of the emergency anti-skid harness. The anti-skid harness may include an adjusting means (not shown) for taking up the slack at the time that the harness is operatively connected to the wheel.

The parts of the anchoring device 20 are so constructed and arranged as to permit reception of a portion of a rim flange 14 within slot 24. At the time the anchoring device is mounted on rim R, as shown in Figures 2 and 8, tongue 30 is inserted between tire casing T and the adjacent portion of flange 14 and the flange portion is received within slot 24. With anchoring device 20 mounted on a rim, as shown in Figures 2 and 8, the parts are so arranged that surfaces 26 and 28 frictionally engage outer and inner surfaces 16 and 18 of the rim flange to thereby maintain the anchoring device in the illustrated position on the flange. The frictional engagement obtained between the contacting surfaces of the body member and the flange is normally adequate to prevent accidental detachment of the device from the rim or displacement of the device along the rim flange.

As an added precaution, for the purpose of preventing undesired movement of the anchoring device with respect to the rim after the device is mounted thereon, the user may effect positive connection between the device and the rim flange. To this end, the flange 44 may be deformed or upset in an inward direction so as to grip inner surface 18 of flange 14. This is accomplished by inserting a tool, such as a star punch, in opening 38, and with a few blows of a hammer, upsetting flange 44 and causing portions thereof to bite into flange 14, as indicated at 56 in Figure 8. While this maintains the anchoring device in preselected position on rim 14, it will be apparent that the device may be removed without difficulty, when desired. The anchoring device 20 may be permanently attached to a rim flange by riveting or in any other manner known to the art.

As is shown in Figure 2, a pair of oppositely disposed anchoring devices 20 of the present invention is attached to rim R, one such device being mounted on a corresponding rim flange. With the anchoring device mounted as shown in Figure 2, it will be observed that its arm 32 is generally parallel to a radius of the rim. Further, the arm projects toward a plane, indicated by line A—A', that is tangent to the rim web 12, and that is normal to the rim radius which is parallel to arm 32. Each arm 32 and its head 36 are positioned wholly rearwardly of the front face 34 of body member 22. The anchoring means illustrated and described prevents accidental disengagement of emergency anti-skid harness 46 and does not present any obstruction which might strike against curbs or vehicle parts, such as tie rod or braking elements, during rotation of the wheel.

The embodiment of the invention shown in Figures 9 and 10 contemplates forming the anchoring device for the anti-skid harness as an integral and permanent part of the wheel rim R. To this end, the rim is blanked to strike out a tongue 60 that includes an arm portion 62 and a head portion 64 corresponding, respectively, to arm 32 and head 36 of the earlier described embodiment. As in the case of the first described embodiment, arm 62 is generally parallel to a radius of the wheel rim and projects toward a plane tangent to the rim web and normal to said rim radius. Also, head 64 projects rearwardly and to each side of arm 62.

From the foregoing, it is believed that the construction, operation, and advantages of my present invention will be readily comprehended by persons skilled in the art. It is to be clearly understood, however, that various changes in the apparatus set forth above may be made without departing from the scope of the invention, it being intended that all matter contained in the description or shown in the drawings shall be interpreted as illustrative only and not in a limiting sense.

I claim:

1. In a device for anchoring anti-skid means to a wheel which has a circular rim that is generally U-shaped in cross section and comprises a web and a pair of spaced flanges, each flange extending outwardly of the web, a tongue struck out of one of the flanges, a substantial portion of the tongue being positioned in spaced relation to the outer surface of the flange and projecting toward a plane tangent to the rim web, and a head at the end of the tongue remote from the flange and projecting generally laterally of the side of the tongue facing the rim.

2. In a device for anchoring anti-skid means to a wheel which has a circular rim that is generally U-shaped in cross section and comprises a web and a pair of spaced flanges, each flange extending outwardly of the web, a tongue struck out of one of the flanges, a substantial portion of the tongue being positioned in spaced relation to the outer surface of the flange and projecting toward a plane tangent to the rim web, the free end of the tongue being bent so as to project inwardly toward the outer surface of the flange.

References Cited in the file of this patent

UNITED STATES PATENTS

| Number | Name | Date |
|---|---|---|
| 1,523,499 | Sullivan | Jan. 20, 1925 |
| 1,714,720 | Meyer | May 28, 1929 |
| 2,171,592 | Nagle | Sept. 5, 1939 |
| 2,241,592 | Goldenberg | May 13, 1941 |
| 2,255,350 | Devlin | Sept. 9, 1941 |
| 2,344,971 | Copp | Mar. 28, 1944 |
| 2,474,521 | Fogarty | June 28, 1949 |
| 2,539,517 | Locke | Jan. 30, 1951 |
| 2,545,061 | Weber | Mar. 13, 1951 |

FOREIGN PATENTS

| Number | Country | Date |
|---|---|---|
| 471,370 | Great Britain | Sept. 3, 1937 |